United States Patent
Moravek et al.

(10) Patent No.: US 9,650,480 B2
(45) Date of Patent: May 16, 2017

(54) CURABLE FILM-FORMING COMPOSITIONS CONTAINING ENCAPSULATED CATALYST COMPONENTS

(71) Applicant: PPG INDUSTRIES OHIO, INC., Cleveland, OH (US)

(72) Inventors: Scott J. Moravek, Mars, PA (US); Steven Bowles, Pittsburgh, PA (US); Davina Schwartzmiller, Rural Valley, PA (US); Wei Wang, Allison Park, PA (US); David Fenn, Allison Park, PA (US); Adam Bradley Powell, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 42 days.

(21) Appl. No.: 14/686,825

(22) Filed: Apr. 15, 2015

(65) Prior Publication Data
US 2016/0304678 A1 Oct. 20, 2016

(51) Int. Cl.
| | |
|---|---|
| *C08J 5/18* | (2006.01) |
| *B82Y 30/00* | (2011.01) |
| *C08F 4/10* | (2006.01) |
| *C08F 4/12* | (2006.01) |
| *C08F 4/16* | (2006.01) |
| *C08F 4/26* | (2006.01) |
| *C09D 7/12* | (2006.01) |
| *C08F 293/00* | (2006.01) |
| *C09D 175/04* | (2006.01) |

(52) U.S. Cl.
CPC .............. *C08J 5/18* (2013.01); *B82Y 30/00* (2013.01); *C08F 4/10* (2013.01); *C08F 4/12* (2013.01); *C08F 4/16* (2013.01); *C08F 4/26* (2013.01); *C08F 293/005* (2013.01); *C09D 7/1266* (2013.01); *C09D 175/04* (2013.01); *C08F 2438/01* (2013.01); *C08F 2438/03* (2013.01); *C08J 2333/10* (2013.01)

(58) Field of Classification Search
None
See application file for complete search history.

(56) References Cited

U.S. PATENT DOCUMENTS

| 6,013,698 A | 1/2000 | Lupton et al. |
|---|---|---|
| 6,916,488 B1 | 7/2005 | Meier et al. |
| 7,064,151 B1 | 6/2006 | Berge et al. |
| 2006/0251896 A1 | 11/2006 | Ferencz et al. |
| 2010/0056722 A1 | 3/2010 | Thomas et al. |
| 2010/0137534 A1 | 6/2010 | Magnet et al. |
| 2010/0190944 A1 * | 7/2010 | Cramail .................. B01J 13/02 526/171 |
| 2011/0237700 A1 | 9/2011 | Miyabayashi |
| 2013/0096006 A1 | 4/2013 | Gunari et al. |
| 2013/0171261 A1 | 7/2013 | Markland et al. |

FOREIGN PATENT DOCUMENTS

| WO | WO-2004063240 A1 * | 7/2004 |
|---|---|---|
| WO | WO-2012151357 A2 * | 11/2012 |

* cited by examiner

*Primary Examiner* — Irina S Zemel
*Assistant Examiner* — Jeffrey Lenihan
(74) *Attorney, Agent, or Firm* — Krisanne Shideler

(57) ABSTRACT

Curable film-forming compositions are provided. The compositions comprise (a) a curing agent comprising reactive functional groups; (b) a film-forming compound comprising functional groups reactive with the reactive functional groups in (a); and (c) a catalyst component added to the curable film-forming composition as a dispersion of micelles in a continuous phase. The catalyst component (c) comprises a catalyst compound contained within or encapsulated by a carrier, and the catalyst compound and carrier together form the micelles in the continuous phase. The carrier comprises block copolymers that comprise at least one hydrophobic block derived from hydrophobic monomers and at least one hydrophilic block derived from (1) hydrophilic monomers and/or (2) monomers containing groups that may be rendered hydrophilic after polymerization.

20 Claims, No Drawings

CURABLE FILM-FORMING COMPOSITIONS CONTAINING ENCAPSULATED CATALYST COMPONENTS

FIELD OF THE INVENTION

The present invention is directed to curable film-forming compositions that comprise a film-forming resin and a controlled-release catalyst component in the form of micelles.

BACKGROUND OF THE INVENTION

Catalysis is an initiation or a change in the rate of a chemical reaction due to the participation of a material called a catalyst. Catalysts that speed the reaction are called positive catalysts. Catalysts that slow the reaction are called negative catalysts, or inhibitors. Unlike reactants, a catalyst is not consumed by the reaction itself.

A catalyst works by providing an alternative reaction pathway to the reaction product. The rate of the reaction is increased when this alternative route has a lower activation energy than the reaction route not mediated by the catalyst. Catalysts can also enable reactions that would otherwise be blocked or slowed by a kinetic barrier. The catalyst may increase reaction rate or selectivity, or enable the reaction to proceed at lower temperatures than would otherwise be possible. As such, catalysts can be very valuable tools in industrial processes. There can be drawbacks to the use of catalysts. For example, tin compounds are used extensively in industrial products such as coatings, as catalysts for isocyanate/hydroxyl reactions. Unfortunately, often the catalyst levels required to provide acceptably fast cure rates and final product properties typically result in a short application time window after the components are mixed.

There is a need to work in a timely manner so that the mixed components maintain a low enough viscosity for spraying. The span of time during which the coating is ready to apply to a substrate and still of low enough viscosity to be applied is commonly referred to as "pot life."

Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot-life is needed less catalyst can be used but the cure speed would also be retarded.

It is also important that the applied coating composition dry and harden quickly so that dirt pick-up is minimized and valuable shop space isn't occupied with the coated substrate, such as an automobile, while it is drying. The length of time between when a coating is applied to a substrate and when the coating has dried or cured sufficiently that dust falling onto the coated substrate will not stick to the coated substrate is referred to as "dust-free time" and is an indicator of the speed of cure. One way to speed the drying and cure of the composition is to add additional catalyst, but this shortens the time available for spraying since higher catalyst levels also cause viscosity of the composition to increase more quickly as reaction rates increase.

It would be desirable to catalyze chemical reactions using catalysts that overcome these drawbacks of the prior art by lengthening the pot life of the composition or by accelerating the reaction rate after application without adversely affecting the pot life.

SUMMARY OF THE INVENTION

In accordance with the present invention, a curable film-forming composition is provided, comprising:
(a) a curing agent comprising reactive functional groups;
(b) a film-forming compound comprising functional groups reactive with the reactive functional groups in (a); and
(c) a catalyst component added to the curable film-forming composition as a dispersion of non-crosslinked micelles in a continuous phase, wherein the catalyst component comprises a catalyst compound contained within or encapsulated by a carrier, and the catalyst compound and carrier together form the micelles in the continuous phase, and wherein the carrier comprises block copolymers that comprise at least one hydrophobic block derived from hydrophobic monomers and at least one hydrophilic block derived from (1) hydrophilic monomers and/or (2) monomers containing groups that may be rendered hydrophilic after polymerization.

Also provided is a curable film-forming composition comprising:
(a) a curing agent comprising reactive functional groups;
(b) a film-forming compound comprising functional groups reactive with the reactive functional groups in (a); and
(c) a catalyst component added to the curable film-forming composition as a dispersion of micelles in a continuous phase, wherein the catalyst component comprises a catalyst compound contained within or encapsulated by a carrier, and the catalyst compound and carrier together form the micelles in the continuous phase, and wherein the carrier comprises block copolymers that are prepared via an ATRP polymerization process and that comprise at least one hydrophobic block derived from hydrophobic monomers and at least one hydrophilic block derived from hydrophilic monomers and/or monomers containing groups that may be rendered hydrophilic after polymerization.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about," even if the term does not expressly appear. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Plural encompasses singular and vice versa; e. g., the singular forms "a," "an," and "the" include plural referents unless expressly and unequivocally limited to one referent. For example, where the invention has been described in terms of "a" polyisocyanate, a plurality, including a mixture of such compounds, can be used.

As used herein, the term "polymer" is meant to refer to prepolymers, oligomers and both homopolymers and copolymers; the prefix "poly" refers to two or more.

The terms "film-forming" and "coating" with respect to compositions are used interchangeably.

The curable film-forming compositions of the present invention may be solventborne or waterborne. The curable compositions typically comprise a reaction mixture and a catalyst component. The reaction mixture comprises (a) a curing, or crosslinking, agent comprising reactive functional groups; and (b) a film-forming compound comprising functional groups reactive with the reactive functional groups in (a).

The unique nature of the coating compositions of the present invention, comprising a film-forming reaction mixture (i. e., a curing agent and film-forming compound) and a catalyst associated with a carrier, may enable them to be provided and stored as one-package compositions prior to use because some or all of the catalyst can be isolated from reacting until desired. A one-package composition will be understood as referring to a composition wherein all the coating components are maintained in the same container after manufacture, during storage, etc. A typical one-package coating can be applied to a substrate and cured by any conventional means, such as by heating, forced air, radiation cure and the like. For some coatings, such as ambient cure coatings, it is not practical to store them as a one-package, but rather they must be stored as multi-package coatings to prevent the components from curing prior to use. The term "multi-package coatings" means coatings in which various components are maintained separately until just prior to application. The present coatings can also be multi-package coatings, such as a two-package coating.

Thus, the components (a) and (b) may be provided as a one-package (1 K) or multi-package, such as a two-package (2K) system. The components of the reaction mixture are often provided in separate packages and mixed together immediately prior to the reaction. When the reaction mixture is a multi-package system, the catalyst component (c) may be present in either one or both of the separate components (a) and (b) and/or as an additional separate component package.

Suitable curing agents (a) for use in the curable film-forming compositions of the present invention include aminoplasts, polyisocyanates, including blocked isocyanates, polyepoxides, beta-hydroxyalkylamides, polyacids, organometallic acid-functional materials, polyamines, polyamides, polysulfides, polythiols, polyenes such as polyacrylates, polyols, polysilanes and mixtures of any of the foregoing, and include those known in the art for any of these materials.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described below, are also suitable as crosslinking agents.

Beta-hydroxyalkylamides are suitable curing agents for polymers having carboxylic acid groups. The beta-hydroxyalkylamides can be depicted structurally as follows:

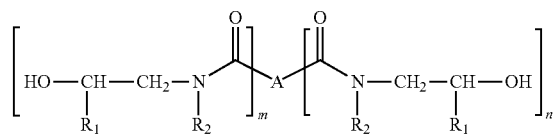

wherein $R_1$ is H or $C_1$ to $C_5$ alkyl; $R_2$ is H, $C_1$ to $C_5$ alkyl, or:

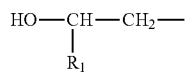

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Non-limiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Suitable polyenes may include those that are represented by the formula:

$$A\text{-}(X)_m$$

wherein A is an organic moiety, X is an olefinically unsaturated moiety and m is at least 2, typically 2 to 6. Examples of X are groups of the following structure:

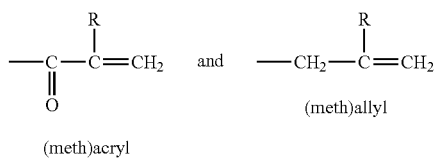

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Aliphatic and/or cycloaliphatic (meth)acrylates in each case are preferably used. (Cyclo)aliphatic polyurethane (meth)acrylates and (cyclo)aliphatic polyester (meth)acrylates are particularly preferred. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth) acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—$S_x$—), wherein x is at least 2, such as from 2 to 4, and combinations of such linkages.

The polythiols for use in the present invention include materials of the formula:

wherein $R^1$ is a polyvalent organic moiety and n is an integer of at least 2, typically 2 to 6.

Non-limiting examples of suitable polythiols include esters of thiol-containing acids of the formula HS—$R^2$—COOH wherein $R^2$ is an organic moiety with polyhydroxy compounds of the structure $R^3$—(OH)$_n$, wherein $R^3$ is an organic moiety and n is at least 2, typically 2 to 6. These components can be reacted under suitable conditions to give polythiols having the general structure:

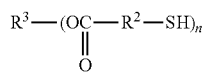

wherein $R^2$, $R^3$ and n are as defined above.

Examples of thiol-containing acids are thioglycolic acid (HS—$CH_2$COOH), α-mercaptopropionic acid (HS—CH($CH_3$)—COOH) and β-mercaptopropionic acid (HS—$CH_2CH_2$COOH) with polyhydroxy compounds such as glycols, triols, tetraols, pentaols, hexaols, and mixtures thereof. Other non-limiting examples of suitable polythiols include ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Suitable polyacids and polyols useful as curing agents include any of those known in the art, such as those described below for the making of polyesters.

Appropriate mixtures of crosslinking agents may also be used in the invention. The amount of the crosslinking agent in the curable film-forming composition generally ranges from 5 to 75 percent by weight based on the total weight of resin solids in the curable film-forming composition, often about 10 to about 35 weight percent, and more often, about 15 to about 25 weight percent.

The film-forming compound (b) used in the curable film-forming compositions of the present invention may be selected from one or more of acrylic polymers, polyesters, polyurethanes, polyamides, polyethers, polythioethers, polythioesters, polythiols, polyenes, polyols, polysilanes polycarbonates, and epoxy resins. Generally these compounds, which need not be polymeric, can be made by any method known to those skilled in the art where the compounds are water dispersible, emulsifiable, or of limited water solubility as understood in the art. The functional groups on the film-forming compound may be selected from at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, acrylate, maleic and mercaptan groups. The functional groups on the film-forming compound are selected so as to be reactive with those on the curing agent (a).

Suitable acrylic compounds include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl) methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

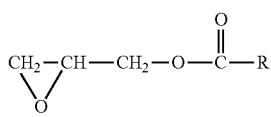

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the film-forming compound (b) in the curable film-forming composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the film-forming compound (b) in the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

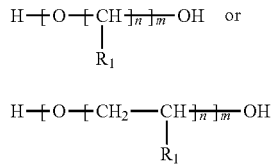

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from Invista, and POLYMEG, available from Lyondell Chemical Co.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

Suitable epoxy functional polymers for use as the film-forming compound (b) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis (hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

Epoxy functional film-forming polymers may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

In certain aspects of the present invention the curing agent (a) may comprise a polyisocyanate and the film-forming compound (b) may comprise a polyol.

In the curable compositions of the present invention, adding the catalyst to the reaction mixture may cause the curing reaction to proceed at a temperature lower than would be required without the use of the catalyst. Also, the reaction may occur faster at a given temperature than would otherwise be observed between the particular reactants. Reactions may be conducted at ambient temperature or at elevated temperatures, such as greater than 30° C., depending on the chemistries involved.

The catalyst component (c) used in the curable film-forming compositions of the present invention comprises a catalyst compound and a polymer prepared from ethylenically unsaturated monomers. The catalyst compound is contained within or encapsulated by the polymer. The polymer forms a carrier encapsulant around the catalyst and contains the catalyst within its interior. The catalyst component is added to the curable film-forming composition as a dispersion of micelles in a continuous phase. The micelles self-assemble in the continuous phase and are formed from the catalyst compound and the carrier. The micelles may or may not be internally crosslinked, as discussed below.

Examples of suitable catalyst compounds include organometal compounds such as hafnium, titanium, tin, zinc, bismuth, aluminum, and zirconium compounds, including zirconium carboxylates and zirconium acetylacetonate. Exemplary tin compounds include trialkyl- and triaryltin halides, acetates, hydroxides, and related compounds, Dibutyltin dioctoate, Dibutyltin dilaurate (DBTDL), Dibutyltin diacetate (DBTA), Dibutyltin sulphide (DBTS), Dibutyltin maleate (DBTM), Dibutyltin-2-ethylhexanoate (DBTEH), Dibutyltin-dineodecanoate (DBTND), Dibutyltin dichloride (DBTCl), Dibutyltin oxide (DBTO), Monobutyltin trichloride (MBTCl), Monobutyltin oxide (MBTO), Dioctyltin dilaurate (DOTL), Dioctyltin diacetate (DOTA), Dioctyltin sulphide (DOTS), Dioctyltin maleate (DOTM), Dioctyltin-2-ethylhexanoate (DOTEH), Dioctyltin-dineodecanoate (DOTND), Dioctyltin dichloride (DOTCl), Dioctyltin oxide (DOTO), Monooctyltin trichloride (MOTCl), and Monooctyltin oxide (MOTO). Other suitable catalysts include Barton's base, bismuth ethylhexanoate, dodecylbenzene sulfonic acid (DDBSA), alkylated phosphines such as trihydroxypropyl phosphine, arylated phosphines such as triphenyl phosphine, amines such as dimethylethanolamine, triethylamine, 1,4-diazabicyclo[2.2.2]octane, 1,8-Diazabicyclo-undec-7-ene (DBU), methyl dicocoamine, and N-ethylmorpholine, and the like.

Naphthanate compounds such as calcium naphthanate, cesium naphthanate, cobalt naphthanate, and dibutyltin naphthanate are also suitable catalysts.

The catalyst compound is present in the catalyst component in an amount of 0.1 to 90 percent by weight, based on the total weight of solids in the catalyst component. For example, the catalyst compound may be present in the catalyst component in an amount of at least 10 percent by weight, often at least 30 percent by weight, or at least 50 percent by weight, or even at least 60 percent by weight, based on the total weight of solids in the catalyst component, as demonstrated in the examples below. Moreover, the catalyst compound may be present in the catalyst component in an amount up to 75 percent by weight, often up to 60 percent by weight, based on the total weight of solids in the catalyst component. The use of catalyst compositions at these loading levels minimizes the amount of the catalyst component that needs to be added to the curable film-forming composition, and thus maximizes overall formulation latitude. Typical weight ratios of polymer to catalyst in the catalyst component range from 1:1-1.35.

The polymers used in the catalyst component of the present invention are prepared from ethylenically unsaturated monomers. The polymers are prepared as block copolymers, usually di-block or tri-block copolymers. Typically, the polymer has at least one block derived from hydrophilic monomers and/or monomers containing groups that may be rendered hydrophilic after polymerization, and at least one block derived from hydrophobic monomers. By "hydrophilic" is meant, as is understood in the art, that the monomers or repeat units in the resulting polymer have a tendency to interact with, be miscible with, or be dissolved by water and/or other polar substances. The monomers themselves may be polar. By definition, a polar molecule has a net dipole as a result of the opposing charges (i.e. having partial positive and partial negative charges) from polar bonds arranged asymmetrically within its structure. When acid functional monomers are used, the hydrophilic monomers may be selected so as to provide the resulting polymer with an acid value of at least 45 mg KOH/g resin, such as at least 60 mg KOH/g resin, or at least 125 mg KOH/g resin, based on the total weight of resin solids of the polymer. Suitable hydrophilic monomers include one or more of methoxypolyethylene glycol (meth)acrylate, (meth)acrylic acid, crotonic acid, itaconic acid, maleic acid and fumaric acid. Hydroxyl functional ethylenically unsaturated monomers may be used, such as hydroxyalkyl acrylates and methacrylates; i. e., hydroxyalkyl (meth)acrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone, as well as other beta-hydroxy ester functional monomers. Methyl (meth)acrylate, (meth)acrylonitrile, dimethylaminoethyl(meth)acrylate, and hydrophilic (meth)acrylamides such as isopropyl (meth)acrylamide are also suitable hydrophilic monomers.

Other suitable hydrophilic monomers include amine functional ethylenically unsaturated monomers such as dimethylaminoethyl (meth)acrylate, diethylaminoethyl (meth)acrylate, and the like. Protonated (cationic) derivatives of these monomers may also be used. As noted above, monomers containing groups that may be rendered hydrophilic after polymerization may also be used to form the hydrophilic portion of the polymer. For example, epoxy functional ethylenically unsaturated monomers such as glycidyl methacrylate and the like may be used to form the copolymer block, and then epoxy functional groups on the resulting polymer may be post-reacted with a compound such as an amino alcohol using known methods to render the polymer block more hydrophilic.

Suitable hydrophobic monomers typically contain a structure with at least four carbon atoms, such as $C_4$ to $C_{20}$ alkyl and $C_6$ or greater aryl, alkaryl, and aralkyl. These groups may be substituted, branched, or cyclic. Examples include one or more of n-butyl (meth)acrylate, isobutyl (meth)acrylate, lauryl (meth)acrylate, 2-ethylhexyl (meth) acrylate, stearyl (meth) acrylate, isobornyl (meth)acrylate, cyclohexyl (meth)acrylate, and styrene. By "hydrophobic" is meant that the monomers have non-polar properties and have a tendency to interact with, be miscible with, or be dissolved by non-polar solvents such as alkanes and oils. By definition, a molecule may be nonpolar either when there is an equal sharing of electrons between the two atoms of a diatomic molecule or because of the symmetrical arrangement of polar bonds in a more complex molecule, such that there is no overall dipole in the molecule.

In preparing the catalyst component of the present invention, a block copolymer is first prepared. In order to control the architecture of the copolymer and ensure the formation of hydrophilic and hydrophobic blocks, controlled radical polymerization processes are often used.

As used herein, the term "controlled radical polymerization" and related terms such as "controlled radical polymerization process" includes, but is not limited to, atom transfer radical polymerization (ATRP), single electron transfer polymerization (SETP), reversible addition-fragmentation chain transfer (RAFT), and nitroxide-mediated polymerization (NMP).

Controlled radical polymerization, such as ATRP and the others listed above, is described generally as a "living polymerization," i.e., a chain-growth polymerization that propagates with essentially no chain transfer and essentially no chain termination. The molecular weight of a polymer prepared by controlled radical polymerization can be controlled by the stoichiometry of the reactants, such as the initial concentration of monomer(s) and initiator(s). In addition, controlled radical polymerization also provides polymers having characteristics including narrow molecular weight distributions, such as polydispersity index (PDI) values within a desired range; and/or well defined polymer chain structure, such as block copolymers and alternating copolymers, which makes it particularly suitable for preparing the catalyst components used in the curable film-forming compositions of the present invention. Living radical polymerization techniques allows chain extension of a polymer of one monomer with a second type of polymer to yield a block copolymer.

The ATRP process can be described generally as including: polymerizing one or more radically polymerizable monomers in the presence of an initiation system; forming a polymer; and isolating the formed polymer. The initiation system may include an initiator having at least one radically transferable atom or group; a transition metal compound, such as a catalyst, which participates in a reversible redox cycle with the initiator; and a ligand, which coordinates with the transition metal compound. The ATRP process is described in further detail in U.S. Pat. Nos. 5,763,548, 5,789,487, 5,807,937, 6,538,091, 6,887,962, and 7,572,874. The polymers used in the catalyst component in the present invention and prepared by controlled radical polymerization may be prepared generally in accordance with the ATRP method disclosed at column 4, line 12, through column 5, line 67 of U.S. Pat. No. 6,265,489 B1, which disclosure is incorporated herein by reference.

Reversible Addition-Fragmentation chain Transfer, or RAFT, polymerization is one of several kinds of reversible-deactivation radical polymerization. It makes use of a chain transfer agent in the form of a thiocarbonylthio or similar compound (such as dithioesters, thiocarbamates, and xanthates; also known as a RAFT agent) to mediate the polymerization via a reversible chain-transfer process and thus afford control over the generated molecular weight, architecture, and polydispersity during a free-radical polymerization.

Nitroxide-mediated radical polymerization (NMP) is a method of radical polymerization that makes use of an alkoxyamine initiator to generate polymers with well controlled stereochemistry and a very low polydispersity index. It is a type of reversible-deactivation radical polymerization.

Different hydrophilic and hydrophobic monomers may be selected for use in the block copolymers, depending on the polymerization process used. For example, in RAFT polymerization processes, acidic monomers such as acrylic acid and methacrylic acid are often included as hydrophilic monomers and 2-ethylhexyl (meth)acrylate and butyl acrylate are suitable as hydrophobic monomers. In ATRP polymerization processes, frequently used hydrophilic monomers include methyl methacrylate and amino-functional monomers such as dimethylaminoethyl (meth)acrylate, and n-butyl methacrylate is often included as a hydrophobic monomer.

Either block may be polymerized first, and the final block copolymer typically has a number average molecular weight of 5000-25000, determined using gel permeation chromatography using a polystyrene standard (with THF as the mobile phase and refractive index as the detection method). Diblock copolymers are most often prepared. The weight ratio of each block is highly flexible; the weight ratio of hydrophobic blocks to hydrophilic blocks may range from 5:95 to 95:5, provided micelles will form and disperse within the continuous phase of the catalyst component.

To prepare the catalyst component (c), the catalyst compound and block copolymers are dispersed together into a continuous medium, where they self-assemble into micelles. The amphiphilic nature of the block copolymers causes one type of block to form an interior domain, or core, of the micelle adjacent the catalyst compound. The core is typically immiscible with the continuous phase of the catalyst component. The other type of block, which is more compatible with the continuous medium, extends radially outward from the center of the micelle into the continuous medium, forming a "shell" or exterior domain of the micelle. Thus the block copolymer forms an encapsulating carrier around the catalyst compound.

The block copolymers may be prepared with monomers having multiple functional groups that allow for crosslinking with themselves or with adjacent block copolymers in the micelle, even to the extent of forming a microgel within the micelle. However, typically when a RAFT or NMP polymerization process is used, the block copolymers are not covalently crosslinked into a microgel.

In certain aspects of the present invention, the hydrophobic blocks form a core of each micelle, the hydrophilic blocks form a shell of each micelle, and the continuous phase of the dispersion is aqueous and/or a polar solvent such as acetone, dimethylformamide, dimethylsulfoxide, N-methylpyrrolidone, methyl ethyl ketone, methyl isobutyl ketone or methanol. An aqueous medium usually comprises at least 20 percent by weight water, more often at least 50 percent by weight water. In this scenario, the catalyst compound is often hydrophobic and compatible with the hydrophobic block of the copolymer. Such catalyst compounds include triphenyl phosphine, methyl dicocoamine, dibutyltin dilaurate, calcium naphthanate, cesium naphthanate, cobalt naphthanate, dibutyl tin diacetate, dibutyl tin dioctoate, dibutyl tin naphthanate, bismuth ethylhexanoate, a zirconium carboxylate, and zinc acetylacetonate. Aqueous or polar dispersions are typically used in solventborne film-forming compositions of the present invention, but may be used in either solventborne or waterborne film-forming compositions.

In alternative aspects of the present invention, the hydrophilic blocks form a core of each micelle, the hydrophobic blocks form a shell of each micelle, and the continuous phase of the dispersion is nonaqueous and/or nonpolar such as mineral spirits, heptane, n-butyl acetate, (o-,m-,p-)xylenes, toluene, aromatic solvent blends such as AROMATIC 100/150/200 available from Exxon Mobil, nonpolar ester alcohols such as TEXANOL, available from Eastman, ethylene glycol diacetate, cyclohexanone, amyl acetate, and methyl isoamyl ketone. In this scenario, the catalyst compound is often hydrophilic and compatible with the hydrophilic block of the copolymer. Such catalyst compounds include dibutyltin oxide, triethylamine, 1,4-diazabicyclo[2.2.2]octane, 1,8-diazabicyclo[5.4.0]undec-7-ene, N-ethylmorpholine dodecylbenzene sulfonic acid, dimethylethanolamine, and trihydroxypropyl phosphine. Nonpolar dispersions are typically used in waterborne film-forming compositions of the present invention, but may be used in either solventborne or waterborne film-forming compositions.

After the polymerization described above, subsequent process steps may be performed or combined in a variety of ways to form the dispersion. They may be performed sequentially in the order listed, or the order may be altered. Two or more of the subsequent process steps may be performed simultaneously. In an exemplary process the following steps may be performed:
 i) either separately or concurrently A) neutralizing any acid or base groups, if desired, on the polymer and B) dispersing the polymer in a substantially aqueous medium to form a polymer dispersion;
 ii) adding a catalyst compound to the polymer dispersion; and
 iii) dispersing the catalyst compound into the polymer dispersion to form a dispersed catalyst composition comprising the catalyst compound contained within or encapsulated by the polymer.

Furthermore, it will be appreciated that step i) can be accomplished by either a "direct thin", in which water is added to the polymer, or by a "reverse thin" in which the polymer is added to water. In either case, the neutralizing agent (if used) can be added to the polymer first, or can be added to the water, in which case the polymer is neutralized and dispersed simultaneously.

Alternatively the catalyst and polymer may be dispersed simultaneously; i. e., the catalyst compound and block copolymer may be dispersed in an substantially aqueous medium by the following steps:
 i) optionally first neutralizing acid or base groups, if present, on the polymer;
 ii) adding a catalyst compound to the polymer to form a mixture;
 iii) either separately or concurrently A) neutralizing acid or base groups on the polymer (if acid or base groups present on the polymer are not neutralized in step i) and it is desired to do so), and B) co-dispersing the polymer and catalyst simultaneously in a substantially aqueous medium to form a dispersed catalyst composition comprising the catalyst compound contained within or encapsulated by the polymer in the form of a micelle.

As above, step iii) can be accomplished by either a "direct thin", in which water is added to the polymer, or by a "reverse thin" in which the polymer is added to water. In either case, the neutralizing agent can be added to the polymer first, or can be added to the water, in which case the polymer is neutralized and dispersed simultaneously.

In both scenarios, it will be further understood by those skilled in the art that if the polymer comprises only non-acid or non-base hydrophilic groups, i.e. "non-ionic" hydrophilic groups such as hydroxyl groups or ether functional groups, neutralization is not required.

Neutralization of acid groups on the polymer is not necessary, but is usually performed and may be done in whole or in part using, for example, inorganic bases such as ammonium hydroxide or amines such as dimethylethanolamine, diisopropanolamine, triethylamine, and the like. Neutralization of base groups likewise is not necessary, but is usually performed and may be done in whole or in part using, for example, inorganic acids such as HCl or organic acids such as acetic acid, propionic acid, lactic acid, and the like.

Note that "water-in-oil" type dispersions of the catalyst compound and carrier may also be prepared using known techniques.

Effective dispersion techniques may include high shear mixing such as by homogenization, emulsification by use of an emulsifier such as a MICROFLUIDIZER® emulsifier which is available from Microfluidics Corporation in Newton, Mass., use of rotor/stator mixers, Cowles dispersers, or mixing a small volume of material with a conventional stirrer at a high agitation rate, such as illustrated in the examples. Dispersion promotes the encapsulation of the catalyst compound by the polymer.

Pot life is herein defined as the span of time during which a coating is ready to apply (for example, because all components have been combined) and still of low enough viscosity to be applied. For other curable compositions, pot life is the span of time during which a curable composition is ready to be molded, cast, or extruded (for example, because all components have been combined) and still of low enough viscosity to be molded, cast, or extruded. Coating compositions of the present invention comprising the encapsulated catalyst components show an extension in pot life compared to curable compositions comprising the same amount of catalyst in unencapsulated form, but still cure within an acceptable time after application. This improvement in working time can be advantageous during application of the coating composition. Alternatively, the encapsulated catalyst components of the present invention may allow the use of higher catalyst levels, resulting in shorter cure times and increased work throughput, but with a pot life comparable to lower loadings of unencapsulated catalysts. This may be desirable in many situations, e.g. in application of automotive refinish coatings.

The catalyst component is used in an amount sufficient to enable or accelerate reaction of any reactive functional groups in the reaction mixture that comprises the curing agent (a) and the film-forming compound (b).

If desired, the coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids, colorants, abrasion resistant particles and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triaryl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. The photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component have minimal migration out of the coating. Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

The catalyst is capable of being released from the carrier via diffusion through the carrier and into the coating composition, typically upon application of a stimulus, allowing for user control of the initiation and/or rate of cure of the coating composition. The stimulus may be as straightforward as the admixture of the catalyst component with the film-forming resin; i. e., the curing agent (a) and the film-forming compound (b). One or more components of the film-forming resin, e. g., a resin or volatile solvent, may cause the micelle to disintegrate such that the carrier may release the catalyst.

Typically, diffusion of the catalyst through the carrier and into the coating composition is initiated or enhanced upon evaporation of the continuous phase solvent. Evaporation of the solvent may occur, for example, upon application of the coating composition to a substrate.

The present invention will further be described by reference to the following examples. The examples are merely illustrative of the invention and are not intended to be limiting. Unless otherwise indicated, all parts are by weight.

EXAMPLES

The following examples are presented to demonstrate the general principles of the invention. Examples 1A and 1C describe the preparation of a hydrophobic/hydrophilic block copolymer via ATRP. Example 1B demonstrates a direct thin of the block copolymer of Example 1 A. Example 1D demonstrates a direct thin of the block copolymer of Example 1C. All amounts listed are described in parts by weight, unless otherwise indicated. The invention should not be construed as limited to the specific examples presented.

Example 1A

A hydrophobic/hydrophilic block copolymer was synthesized via ATRP according to the procedure below.

|  | Mass (g) |
|---|---|
| Charge A | |
| Ethylene glycol monobutyl ether | 101.93 |
| Ethyl 2-Bromoisobutyrate | 6.54 |
| Copper (II) Bromide | 0.34 |
| (ethylhexylacrylate)$_6$-TREN[1] | 2.10 |
| Charge B | |
| Tin (II) Ethylhexanoate | 6.27 |
| Dimethylaminoethyl Methacrylate | 81.05 |
| Methyl Methacrylate | 25.78 |
| Charge C | |
| Tin (II) Ethylhexanoate | 6.27 |
| Butyl Methacrylate | 396.30 |
| Ethylene glycol monobutyl ether | 305.80 |

|  | Mass (g) |
|---|---|
| Charge D | |
| Propylene glycol methyl ether | 12.74 |
| 2,2'-Azobis(2-methylbutanenitrile) | 1.27 |

[1]Synthesized by reacting six molar equivalences of ethylhexyl acrylate with one molar equivalent of tris(2-aminoethyl)amine (TREN)

Charge A was added into a 4-neck round bottom flask with condenser, nitrogen adaptor, mechanical stirrer, and addition funnel. Charge A had residual oxygen removed by bubbling with nitrogen for 20 minutes (nitrogen sparge). The reaction was heated to 80° C. under nitrogen blanket with agitation. Charge B was sparged with nitrogen for 20 minutes, added over 30 minutes, and held at 80° C. for 2 hours. Charge C was sparged with nitrogen for 20 minutes, added over 30 minutes, and heated at 80° C. for 3 hours. Charge D was added quickly to the reaction and held at 80° C. for 1 hour. The light green solution was poured and % solids were checked by heating sample at 110° C. for 1 hour in an oven (52.0% solids). GPC in THF as mobile solvent: Mn 4695, Mw 56449, PDI 12.0.

Example 1B

A direct thin of the block copolymer from Example 1A was carried out using n-butyl acetate according to the procedure below.

|  | Mass (g) |
|---|---|
| Charge A | |
| Example 1A | 25.30 |
| n-Butyl acetate | 126.90 |
| Charge B | |
| Water | 7.70 |
| Formic Acid | 7.10 |
| 2-Dimethylaminoethanol | 7.60 |

Add Charge A into an 8 oz jar and stir for 15 minutes. Add Charge B over 5 minutes and stir for 30 minutes.

Example 1C

A hydrophobic/hydrophilic block copolymer was synthesized via ATRP according to the procedure below.

|  | Mass (g) |
|---|---|
| Charge A | |
| Ethylene glycol monobutyl ether | 608.31 |
| NMP | 17.34 |
| Water | 3.425 |
| Ethyl 2-bromoisobutyrate | 6.55 |
| Copper(II) Bromide | 0.943 |
| Bypyridyl | 1.319 |
| Charge B | |
| Methyl methacrylate | 83.91 |
| Dimethylaminoethyl methacrylate | 306.67 |
| Tin(II) ethylhexanoate | 3.17 |
| Charge C: | |

-continued

| | Mass (g) |
|---|---|
| Tin(II) ethylhexanoate | 3.17 |
| Butyl methacrylate | 212.15 |

Add Charge A into a 4-neck round bottom flask with condenser, nitrogen adaptor, mechanical stirrer, and addition funnel. Charge A had residual oxygen removed by bubbling with nitrogen for 40 minutes (nitrogen sparge). The reaction was heated to 70° C. under nitrogen blanket with agitation. Charge B was sparged with nitrogen for 30 minutes, added over 30 minutes, and held at 70° C. for 1 hour. Charge C was sparged with nitrogen for 30 minutes, added over 30 minutes, and heated at 70° C. for 5 hours. The light green solution was poured and % solids were checked by heating sample at 110° C. for 1 hour in an oven (45.69% solids). GPC in DMF as mobile solvent: Mn 19289, Mw 31326, PDI 1.6.

Example 1D

Direct Thin of Hydrophilic/Hydrophobic Block Copolymer Water

| | Mass (g) |
|---|---|
| Charge A | |
| EXAMPLE 1C | 35 |
| Dibutyl tin dilaurate. | 16 |
| Formic acid | 0.57 |
| Charge B | |
| Water | 267.1 |

Add Charge A into a 4-neck round bottom flask with condenser, mechanical stirrer, and addition funnel. The reaction was heated to 50° C. with agitation. Charge B was added over 30 minutes at 50° C. Solution was stirred at 50° C. for 30 minutes and the poured.

Example 2

A pigment grind was prepared in a stainless steel beaker according to the following procedure:

| Item description | Mass (g) |
|---|---|
| Thiocure petmp[1] | 668.6 |
| DISPERBYK-163[2] | 7.5 |
| BYK-325[2] | 7.5 |
| n-butyl acetate | 71.6 |
| Stir with Cowles blade for 5 minutes | |
| Mapico Black 845[3] | 12.1 |
| n-butyl acetate | 10.8 |
| Stir with Cowles blade for 5 minutes | |
| Talcron MP 15-38[4] | 417.5 |
| Tioxide TR92[3] | 33.4 |
| n-butyl acetate | 71.6 |
| Stir with Cowles blade for 20 minutes | |

[1]Available from BRUNO BOCK Chemische Fabrik GmbH & Co. KG
[2]Available from BYK USA Inc.
[3]Available from Huntsman
[4]Available from Barretts Minerals Inc.

Then the dispersion was placed on a Hockmeyer Micromill equipped with Zirconox 0.7-1.2 mm grinding media. While milling, dry ice was placed around the container to control the temperature. The dispersion was milled until a particle size of 18-20 microns was achieved. The mixture was then reduced with 220.4g of n-butyl acetate.

Example 3

Example formulations listed in the table below were combined and monitored for pot life. Pot life is determined by viscosity change over time on a CAP 2000 Viscometer with a #1 spindle set at 900RPM at 25° C. The time it takes for the viscosity to double that of the initial viscosity is reported as pot life. Select formulations were also tested for film drying and curing properties. "Tack-free time" is the amount of time required for a coating to achieve a level of dryness, such that upon the application and removal of a cotton ball, no cotton fibers are transferred to the coating surface. MEK double rubs are reported as the number of double rubs, with a methyl ethyl ketone soaked rag, required to dissolve the coating such that the substrate is visible. This test was performed 1 hr after tack-free and the maximum number of double rubs recorded is 100. Example 3A is a control demonstrating the preparation of a film-forming composition with no catalyst. Example 3B is a comparative example wherein the film-forming composition contains free catalyst, and Example 3C demonstrates the preparation of a curable film-forming composition in accordance with the present invention.

| | Formula by weight (g) | | |
|---|---|---|---|
| Formula | 3A | 3B | 3C |
| Example 2 | 50 | 50 | 50 |
| SR399LV[1] | 17.4 | 17.4 | 17.4 |
| n-butyl acetate | 4.1 | 4.1 | 4.1 |
| N,N-Dimethylethanolamine | 0 | 0.05 | 0 |
| Example 1B | 0 | 0 | 0.58[2] |
| Properties | | | |
| Pot life (min) | 45 | 15-30 | 30-45 |
| Tack-free time (min) | >240 | 90-105 | 15-30 |
| MEK Double Rubs | n/a | 100 | 100 |

[1]Penta-functional acrylate available from SARTOMER ARKEMA
[2]Equal N,N-Dimethylethanolamine amount to formula 3B The compositions of Example 3A, 3B, and 3C were spray applied with a 3M Accu-Spray HG18 spray gun with 1.8mm nozzle to an ACT cold roll steel panels (10.16 cm by 30.48 cm) with ED6060 electrocoat available from ACT Laboratories, Inc. The compositions were applied in two coats with an ambient flash until visibly dry between coats. A dry film thickness of about 2.5 to 3.5 mils (about 64 to 89 micrometers) was targeted. After coating application, cure was allowed to occur at ambient conditions.

It can be seen from above data that incorporation of Example 1B in formula 3C provides for extended pot life as compared to the free catalyst formula 3B while also having a faster tack-free time. This combination of pot-life and fast tack-free time is desirable.

Each of the characteristics and examples described above, and combinations thereof, may be said to be encompassed by the present invention. The present invention is thus drawn to the following nonlimiting aspects: in a first aspect, a curable film-forming composition is provided by the present invention, comprising: (a) a curing agent comprising reactive functional groups; (b) a film-forming compound comprising functional groups reactive with the reactive functional groups in (a); and (c) a catalyst component added to the curable film-forming composition as a dispersion of non-crosslinked micelles in a continuous phase, wherein the catalyst component comprises a catalyst compound contained within or encapsulated by a carrier, and the catalyst compound and carrier together form the micelles in the continuous phase, and wherein the carrier comprises block copolymers that comprise at least one hydrophobic block derived from hydrophobic monomers and at least one hydrophilic block derived from (1) hydrophilic monomers and/or (2) monomers containing groups that may be rendered hydrophilic after polymerization.

In a second aspect, a curable film-forming composition is provided by the present invention, comprising: (a) a curing agent comprising reactive functional groups; (b) a film-forming compound comprising functional groups reactive with the reactive functional groups in (a); and (c) a catalyst component added to the curable film-forming composition as a dispersion of micelles in a continuous phase, wherein the catalyst component comprises a catalyst compound contained within or encapsulated by a carrier, and the catalyst compound and carrier together form the micelles in the continuous phase, and wherein the carrier comprises block copolymers that are prepared via an ATRP or NMP polymerization process and that comprise at least one hydrophobic block derived from hydrophobic monomers and at least one hydrophilic block derived from (1) hydrophilic monomers and/or (2) monomers containing groups that may be rendered hydrophilic after polymerization.

In a third aspect, in any of the compositions according to either of the first or second aspect described above, the hydrophobic blocks form a core of each micelle, the hydrophilic blocks form a shell of each micelle, and the continuous phase of the dispersion is aqueous and/or a polar solvent.

In a fourth aspect, in any of the compositions according to the third aspect above, the catalyst compound comprises one or more of dibutyltin dilaurate, calcium naphthanate, cesium naphthanate, cobalt naphthanate, dibutyl tin diacetate, dibutyl tin dioctoate, dibutyl tin naphthanate, bismuth ethylhexanoate, a zirconium carboxylate, and zinc acetylacetonate.

In a fifth aspect, in any of the compositions according to either of the first or second aspect described above, the hydrophilic blocks form a core of each micelle, the hydrophobic blocks form a shell of each micelle, and the continuous phase of the dispersion is nonaqueous and nonpolar.

In a sixth aspect, in any of the compositions according to the fifth aspect above, the catalyst compound comprises one or more of dibutyltin oxide, triethylamine, 1,4-diazabicyclo[2.2.2]octane, 1,8-diazabicyclo[5.4.0]undec-7-ene, N-ethylmorpholine, dodecylbenzene sulfonic acid, dimethylethanolamine, and trihydroxypropyl phosphine.

In a seventh aspect, in any of the compositions according to any of the aspects above, the hydrophobic monomers include one or more of n-butyl (meth)acrylate, isobutyl (meth)acrylate, lauryl (meth)acrylate, 2-ethylhexyl (meth) acrylate, stearyl (meth) acrylate, styrene, isobornyl (meth) acrylate, and cyclohexyl (meth)acrylate.

In an eighth aspect, in any of the compositions according to any of the aspects above, the hydrophilic monomers or monomers containing groups that may be rendered hydrophilic after polymerization include one or more of methoxypolyethylene glycol (meth)acrylate, hydroxyethyl (meth) acrylate, hydroxypropyl (meth)acrylate, 4-hydroxybutyl (meth)acrylate, hydroxy functional adducts of caprolactone, (meth)acrylic acid, crotonic acid, itaconic acid, maleic acid, fumaric acid, isopropyl acrylamide, methyl acrylate, acrylonitrile, and dimethylaminoethyl(meth)acrylate.

In a ninth aspect, in any of the compositions according to any of the aspects above, the catalyst compound is present in the catalyst component (c) in an amount of 0.1 to 90 percent by weight, based on the total weight of solids in the catalyst component (c).

In a tenth aspect, in any of the compositions according to any of the aspects above, the composition is a two-package composition, and the catalyst component (c) is present with the curing agent (a) in a first package and/or with the film-forming compound (b) in a second package.

In an eleventh aspect, in any of the compositions according to the first aspect above, the carrier comprises block copolymers that are prepared via a RAFT polymerization process.

In a twelfth aspect, in any of the compositions according to the second aspect above, the block copolymers are not covalently crosslinked into a microgel.

Whereas particular aspects of this invention have been described above for purposes of illustration, it will be evident to those skilled in the art that numerous variations of the details of the present invention may be made without departing from the invention as defined in the appended claims. It is understood, therefore, that this invention is not limited to the particular aspects disclosed, but it is intended to cover modifications that are within the spirit and scope of the invention, as defined by the appended claims.

What is claimed is:

1. A curable film-forming composition comprising:
   (a) a curing agent comprising reactive functional groups;
   (b) a film-forming compound comprising functional groups reactive with the reactive functional groups in (a); and
   (c) a catalyst component added to the curable film-forming composition as a dispersion of non-crosslinked micelles in a continuous phase, wherein the catalyst component comprises a catalyst compound contained within or encapsulated by a carrier, and the catalyst compound and carrier together form the micelles in the continuous phase, and wherein the carrier comprises block copolymers that comprise at least one hydrophobic block derived from hydrophobic monomers and at least one hydrophilic block derived from (1) hydrophilic monomers and/or (2) monomers containing groups that may be rendered hydrophilic after polymerization.

2. The curable film-forming composition of claim 1, wherein the hydrophobic blocks form a core of each micelle, the hydrophilic blocks form a shell of each micelle, and the continuous phase of the dispersion is aqueous and/or a polar solvent.

3. The curable film-forming composition of claim 2, wherein the catalyst compound comprises one or more of dibutyltin dilaurate, calcium naphthanate, cesium naphthanate, cobalt naphthanate, dibutyl tin diacetate, dibutyl tin dioctoate, dibutyl tin naphthanate, bismuth ethylhexanoate, a zirconium carboxylate, and zinc acetylacetonate.

4. The curable film-forming composition of claim 2, wherein the block copolymers are prepared via a RAFT or NMP polymerization process.

5. The curable film-forming composition of claim 1, wherein the hydrophilic blocks form a core of each micelle, the hydrophobic blocks form a shell of each micelle, and the continuous phase of the dispersion is nonaqueous and/or nonpolar.

6. The curable film-forming composition of claim 5, wherein the catalyst compound comprises one or more of dibutyltin oxide, triethylamine, 1,4-diazabicyclo[2.2.2] octane, 1,8-diazabicyclo[5.4.0] undec-7-ene, N-ethylmorpholine dodecylbenzene sulfonic acid, dimethylethanolamine, and trihydroxypropyl phosphine.

7. The curable film-forming composition of claim 1, wherein the hydrophobic monomers include one or more of n-butyl (meth)acrylate, isobutyl (meth)acrylate, lauryl (meth)acrylate, 2-ethylhexyl (meth) acrylate, stearyl (meth) acrylate, styrene, isobornyl (meth)acrylate, and cyclohexyl (meth)acrylate.

8. The curable film-forming composition of claim 1, wherein the hydrophilic monomers or monomers containing groups that may be rendered hydrophilic after polymerization include one or more of methoxypolyethylene glycol (meth)acrylate, hydroxyethyl (meth)acrylate, hydroxypropyl (meth)acrylate, 4-hydroxybutyl (meth)acrylate, hydroxy functional adducts of caprolactone, (meth)acrylic acid, crotonic acid, itaconic acid, maleic acid, fumaric acid, isopropyl acrylamide, methyl acrylate, acrylonitrile, and dimethylaminoethyl(meth)acrylate.

9. The curable film-forming composition of claim 1, wherein the catalyst compound is present in the catalyst component (c) in an amount of 0.1 to 90 percent by weight, based on the total weight of solids in the catalyst component (c).

10. The curable film-forming composition of claim 1, wherein the composition is a two-package composition, and the catalyst component (c) is present with the curing agent (a) in a first package and/or with the film-forming compound (b) in a second package.

11. A curable film-forming composition comprising:
(a) a curing agent comprising reactive functional groups;
(b) a film-forming compound comprising functional groups reactive with the reactive functional groups in (a); and
(c) a catalyst component added to the curable film-forming composition as a dispersion of micelles in a continuous phase, wherein the catalyst component comprises a catalyst compound contained within or encapsulated by a carrier, and the catalyst compound and carrier together form the micelles in the continuous phase, and wherein the carrier comprises block copolymers that are prepared via an ATRP polymerization process and that comprise at least one hydrophobic block derived from hydrophobic monomers and at least one hydrophilic block derived from (1) hydrophilic monomers and/or (2) monomers containing groups that may be rendered hydrophilic after polymerization.

12. The curable film-forming composition of claim 11, wherein the hydrophobic blocks form a core of each micelle, the hydrophilic blocks form a shell of each micelle, and the continuous phase of the dispersion is aqueous and/or a polar solvent.

13. The curable film-forming composition of claim 12, wherein the block copolymers are not covalently crosslinked into a microgel.

14. The curable film-forming composition of claim 12, wherein the catalyst compound comprises one or more of triphenyl phosphine, methyl dicocoamine, dibutyltin dilaurate, calcium naphthanate, cesium naphthanate, cobalt naphthanate, dibutyltin diacetate, dibutyl tin dioctoate, dibutyl tin naphthanate, bismuth ethylhexanoate, a zirconium carboxylate, and zinc acetylacetonate.

15. The curable film-forming composition of claim 11, wherein the hydrophilic blocks form a core of each micelle, the hydrophobic blocks form a shell of each micelle, and the continuous phase of the dispersion is nonaqueous and/OR nonpolar.

16. The curable film-forming composition of claim 15, wherein the catalyst compound comprises one or more of dibutyltin oxide, triethylamine, 1,4-diazabicyclo[2.2.2] octane, 1,8-diazabicyclo[5.4.0] undec-7-ene, N-ethylmorpholine dodecylbenzene sulfonic acid, dimethylethanolamine, and trihydroxypropyl phosphine.

17. The curable film-forming composition of claim 11, wherein the hydrophobic monomers include one or more of n-butyl (meth)acrylate, isobutyl (meth)acrylate, lauryl (meth)acrylate, 2-ethylhexyl (meth) acrylate, stearyl (meth) acrylate, styrene, isobornyl (meth)acrylate, and cyclohexyl (meth)acrylate.

18. The curable film-forming composition of claim 11, wherein the hydrophilic monomers or monomers containing groups that may be rendered hydrophilic after polymerization include one or more of methoxypolyethylene glycol (meth)acrylate, hydroxyethyl (meth)acrylate, hydroxypropyl (meth)acrylate, 4-hydroxybutyl (meth)acrylate, hydroxy functional adducts of caprolactone, (meth)acrylic acid, crotonic acid, itaconic acid, maleic acid, fumaric acid, isopropyl acrylamide, methyl acrylate, acrylonitrile, and dimethylaminoethyl(meth)acrylate.

19. The curable film-forming composition of claim 11, wherein the catalyst compound is present in the catalyst component (c) in an amount of 0.1 to 90 percent by weight, based on the total weight of solids in the catalyst component (c).

20. The curable film-forming composition of claim 11, wherein the composition is a two-package composition, and the catalyst component (c) is present with the curing agent (a) in a first package and/or with the film-forming compound (b) in a second package.

* * * * *